United States Patent [19]

Hawbaker

[11] 4,261,431
[45] Apr. 14, 1981

[54] CONTROL FOR EFFECTING DOWNSHIFT DURING VEHICLE TURNING OPERATIONS

[75] Inventor: Jerry B. Hawbaker, Bellevue, Iowa
[73] Assignee: Deere & Company, Moline, Ill.
[21] Appl. No.: 33,768
[22] Filed: Apr. 27, 1979
[51] Int. Cl.³ ............................................. B62D 11/04
[52] U.S. Cl. ..................................... 180/6.48; 60/427; 60/484
[58] Field of Search .................. 180/6.48, 6.5; 60/420, 60/421, 423, 427, 484

[56] References Cited
U.S. PATENT DOCUMENTS
3,803,841  4/1974  Erikson .................................. 60/421

Primary Examiner—John P. Silverstrim

[57] ABSTRACT

A vehicle is provided with right and left traction drives powered by first and second reversible two-speed hydraulic motors. A solenoid-operated speed control valve is coupled to the motors for shifting the latter to high speed operation in response to the valve being energized. Travel control valves for the motor are coupled to switches connected in the circuitry for controlling the speed control valve such that during high speed operation of the vehicle the motors will be automatically downshifted in response to the travel control valves being operated to cause the vehicle to be turned.

2 Claims, 1 Drawing Figure

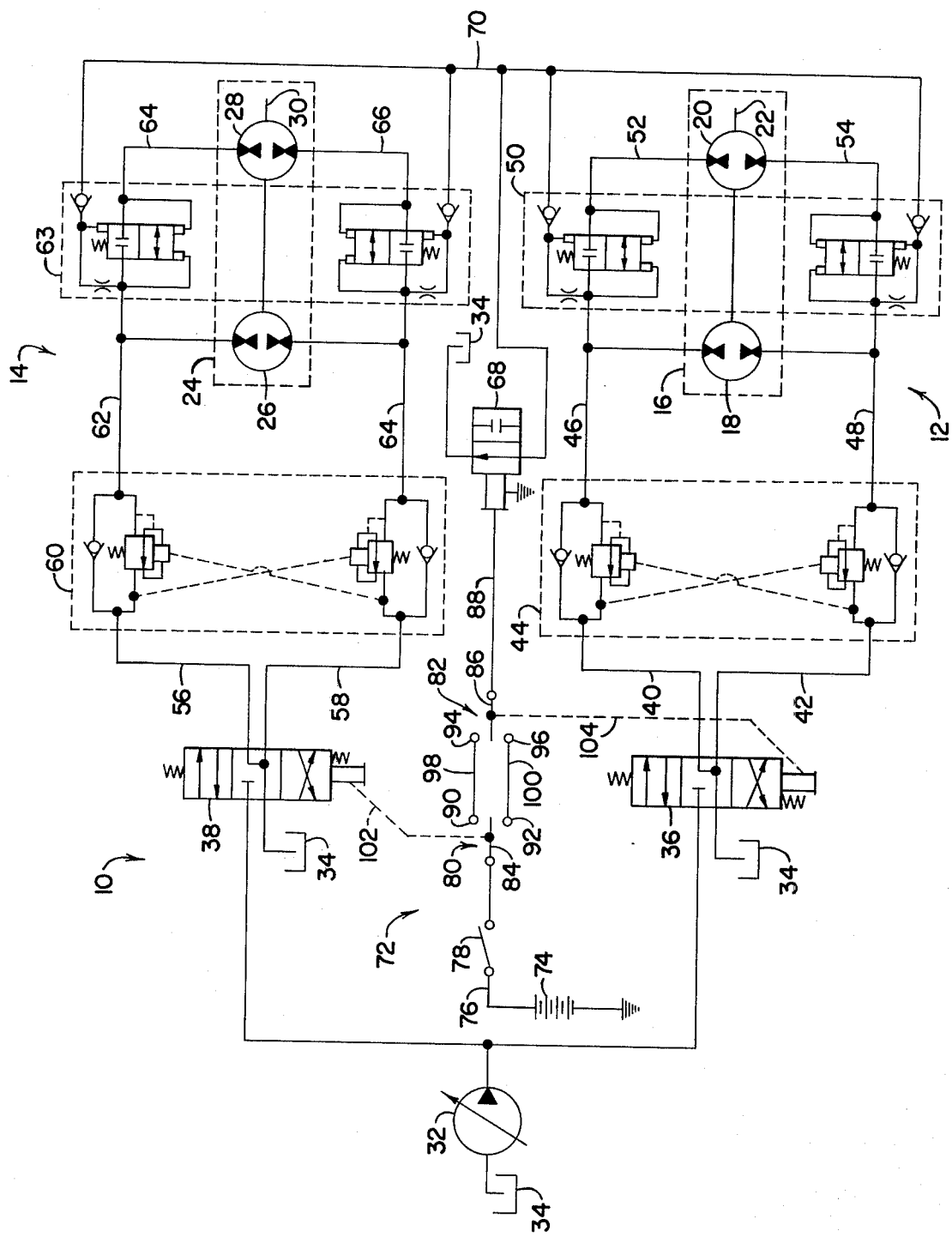

CONTROL FOR EFFECTING DOWNSHIFT DURING VEHICLE TURNING OPERATIONS

BACKGROUND OF THE INVENTION

The present invention relates to vehicle traction drives including right and left two-speed, hydraulic motors and more specifically relates to speed controls for such motors.

Vehicles such as crawler-type excavators are commonly provided with traction drives including separate, two-speed hydraulic motors for driving the tracks at the opposite sides of the vehicle. In a known system for controlling the shifting of the motors between their two speeds there is provided a two-position solenoid speed control valve selectively actuated by an "on-off" speed control toggle switch, the motors being conditioned to operate in slow speed when the switch is "off" and the valve is in a deenergized position and being conditioned to operate in high speed when the switch is "on" and the valve is in an energized position. When driving these vehicles across a field at high speed it sometimes becomes necessary to realign the vehicle to keep it on a desired course and, since turning requires higher torque than is required for proceeding straight, it is often necessary to downshift the motors in order to make the realignment. Since it may be necessary to make several such adjustments if the vehicle is being driven very far, operators are often annoyed at having to constantly manipulate the speed control switch.

SUMMARY OF THE INVENTION

According to the present invention there is provided a novel speed control for two-speed hydraulic propelling motors.

A broad object of the invention is to provide a control for effecting automatic downshifting of two-speed propelling motors in response to the motors being actuated to turn the vehicle during high speed operation of the latter.

A more specific object of the invention is to provide a pair of switches in series with each other and with the speed control switch for controlling the speed control valves and to couple the pair of switches for being respectively automatically operated by a pair of propelling motor direction control valves, such that when the speed control switch is "on", current to the speed control valve will be automatically discontinued to effect downshifting of the motors anytime the motors are being controlled to effect a turn.

These and other objects will become apparent from a reading of the ensuing description together with the appended drawing.

BRIEF DESCRIPTION OF THE DRAWING

The sole FIGURE is a schematic representation of a drive system including a pair of two-speed hydraulic propelling motors and including speed controls constructed in accordance with the principles of the present invention.

DESCRIPTION OF THE PREFERRED EMBODIMENT

Referring now to the drawing, therein is shown a propelling or traction drive system 10. The system 10 includes identical right and left drives 12 and 14 for powering right and left ground engaging traction elements such as crawler tracks, for example. The right drive 12 comprises a reversible, two-speed hydraulic motor assembly 16 including high speed motor section 18 and hydraulically parallel low speed motor section 20 coupled to an output shaft 22. Similarly, the left drive 14 comprises a reversible, two-speed hydraulic motor assembly 24 including high speed motor section 26 and hydraulically parallel low speed motor section 28 coupled to an output shaft 30.

Provided for supplying a source of pressure fluid for operating the motor assemblies 16 and 24 is a pump 32 having an inlet coupled to a sump 34, the pump and sump being connected to right and left motor control valves 36 and 38. The valves 36 and 38 are here shown in a centered or neutral position wherein they block communication of the pump 32 with the motor assemblies 16 and 24 while connecting the motor assemblies to the sump 34 to thereby neutralize the drives 12 and 14.

The valve 36 controls the flow of fluid to and from the right motor assembly 16 and fluid is conveyed to and from the assembly 16 by means of a first set of supply-return lines 40 and 42 connected between the valve 36 opposite sections of a cross over valve assembly 44, a second set of supply-return lines 46 and 48 respectively connected between the opposite sections of the valve assembly 44 and opposite work ports of the high speed motor section 18 and opposite sections of a pilot pressure operated speed control valve assembly 50, and a third set of supply return lines 52 and 54 respectively connected between the opposite sections of the valve assembly 50 and opposite work ports of the low speed motor section 20.

Similarly, the valve 38 controls the flow of fluid to and from the left motor assembly 24 and fluid is conveyed to and from the assembly 24 by means of a fourth set of supply-return lines 56 and 58 connected between the valve 38 and opposite sections of a cross over valve assembly 60, a fifth set of supply-return lines 62 and 64 respectively connected between the opposite sections of the valve assembly 60 and opposite work ports of the high speed motor section 26 and opposite sections of a pilot pressure operated speed control valve assembly 63, and a sixth set of supply-return lines 64 and 66, respectively, coupled between the opposite sections of the valve assembly 62 and opposite work ports of the low speed motor section 28.

Coupled for simultaneously controlling the pilot pressure operated speed control valve assemblies 50 and 63 is a solenoid-operated speed control valve 68 here shown in a de-activated position wherein it connects a pilot pressure control line 70 to the sump 34, the line 70 being coupled to the opposite sections of each of the valve assemblies 50 and 63 such that when the line 70 is coupled to the sump the valve and assemblies 50 and 63 are conditioned to block flow from the high speed motor sections 20 and 26.

The structure described hereinabove is conventional, it being noted that the invention is embodied in the controls to be presently described. Accordingly, further details of the abovedescribed hydraulic system and its operation are omitted for the sake of brevity.

Provided for controlling the solenoid-operated speed control valve 68 is an electrical circuit 72 including a source of electrical current here shown in the form of a battery 74. The battery 74 is coupled to a lead 76 including an "on-off" speed control switch 78, which, in the known system described hereinabove in the Background of the Invention, is connected directly to the solenoid of the valve 68. Here, however, the switch 78 is connected in series with a pair of single pole, double throw switches 80 and 82, which are in turn connected in series with each other. The switch 80 includes a pole or switching element 84 coupled to the lead 76 while the swtich 82 includes a pole or switching element 86 coupled to a lead 88, which is in turn coupled to the solenoid-operated speed control valve 68. The switch 80 includes a pair of contacts 90 and 92 located on opposite sides of the switching element 84 while the switch 82 includes a pair of contacts 94 and 96 on the opposite sides of the switching element 86. A lead 98 interconnects the contacts 90 and 94 and a lead 100 interconnects the contacts 92 and 96. The switching element 84 is coupled, as represented functionally by a line 102, such as to be actuated simultaneously with the motor control valve 38 while the switching element 86 is similarly coupled, as represented functionally by a line 104, such as to be actuated simultaneously with the motor control valve 36. When the motor control valves 36 and 38 are both in their illustrated neutral positions, the switching elements 84 and 86 are respectively located in centered open positions between the contacts 90 and 92 and between the contacts 94 and 96. When the motor control valves 36 and 38 are shifted downwardly, as viewed in the drawing, to respective positions for effecting forward drive conditions in the motor assemblies 16 and 24, the elements 84 and 86 will respectively be automatically shifted into engagement with the contacts 92 and 96, and, similarly, when the valves 36 and 38 are shifted to respective positions for effecting reverse drive conditions in the motor assemblies 16 and 34, the elements 84 and 86 will respectively be automatically shifted into engagement with the contacts 90 and 94.

Thus, it will be appreciated that when the vehicle embodying the propelling drive system 10 is being driven at high speed across a field, the speed control switch 78 will be closed and the switch elements 84 and 86 will be in contact with the contacts 92 and 96 thus establishing a complete circuit to the solenoid-operated speed control valve 68. If the operator then desires to change the course of the vehicle, he needs only to stop rotation of one or the other of the right and left motor assemblies 18 and 20. Such stopping is done by moving one or the other of the motor control valves 36 and 38 to their neutral position which effects movement of one or the other of the switching elements 84 and 86 to its centered position resulting in the circuit to the valve 68 being automatically opened to de-energize the same to automatically downshift the motor assemblies to their low speed drive conditon. Once the turn is completed, whichever one of the valves 36 or 38 that was actuated to effect the turn is returned to its forward drive effecting position and the associated switch element automatically restores a complete circuit to the solenoid 68 to automatically upshift the motor assemblies to their high speed drive condition.

I claim:

1. In combination with a vehicle drive system including a pair of reversible, two-speed hydraulic motor assemblies respectively controlled by means of a pair of motor assembly control valves, a solenoid-operated speed control valve coupled to the pair of motor assemblies for effecting low speed operation thereof when the speed control valve is de-energized and for effecting high speed operation thereof when the speed control valve is energized, and a control circuit for the solenoid-operated speed control valve including a source of electrical energy and a lead connected to the source and including an "on-off" speed control switch, the improvement wherein the control circuit comprises: valve operation responsive switch means coupled in series with the speed control switch and with the solenoid-operated valve; operating means coupled between the pair of motor assembly control valves and the valve operation responsive switch means for controlling the latter such as to effect a complete circuit to the speed control valve only when the speed control switch is "on" and the motor control valves are each in positions for effecting the same direction of rotation in the motors, whereby the motors are automatically downshifted anytime the speed control switch is "on" and the motor assembly control valves are actuated to different positions such as to control the motor assemblies to effect a turn.

2. In combination with a vehicle traction drive including a first reversible, two-speed hydraulic motor assembly for driving a first ground-engaging traction device at a right side of the vehicle and a second reversible, two-speed, hydraulic motor assembly for driving a second ground-engaging traction device at a left side of the vehicle, a first travel control valve coupled to the first motor assembly and shiftable to opposite sides of a neutral position to forward and reverse drive effecting positions, a second travel control valve coupled to the second motor and shiftable to opposite sides of a neutral position to forward and reverse drive effecting positions, a solenoid-operated speed control valve coupled to the first and second motors and operable between a de-energized position, for effecting a low drive speed in the motors and an energized position for effecting a high drive speed in the motor assemblies, and a source of electric current and an electrical circuit connecting the source to the solenoid-operated valve including a two-speed control switch movable between an open, slow speed effecting position and a closed, high speed effecting position; the improvement of an automatic downshift control, comprising: first and second double pole switches connected in series with each other and with the two-speed control swtich; and said first and second double pole switches respectively being coupled to the first and second travel control valves for being operated by the latter to complete a circuit to the solenoid only when the two-speed control switch is closed and both travel control valves are in either their forward or their reverse drive effecting position.

* * * * *